(No Model.)
H. H. TAYLOR.
MACHINE FOR THREADING TAPERING BUSHINGS.
No. 331,167. Patented Nov. 24, 1885.
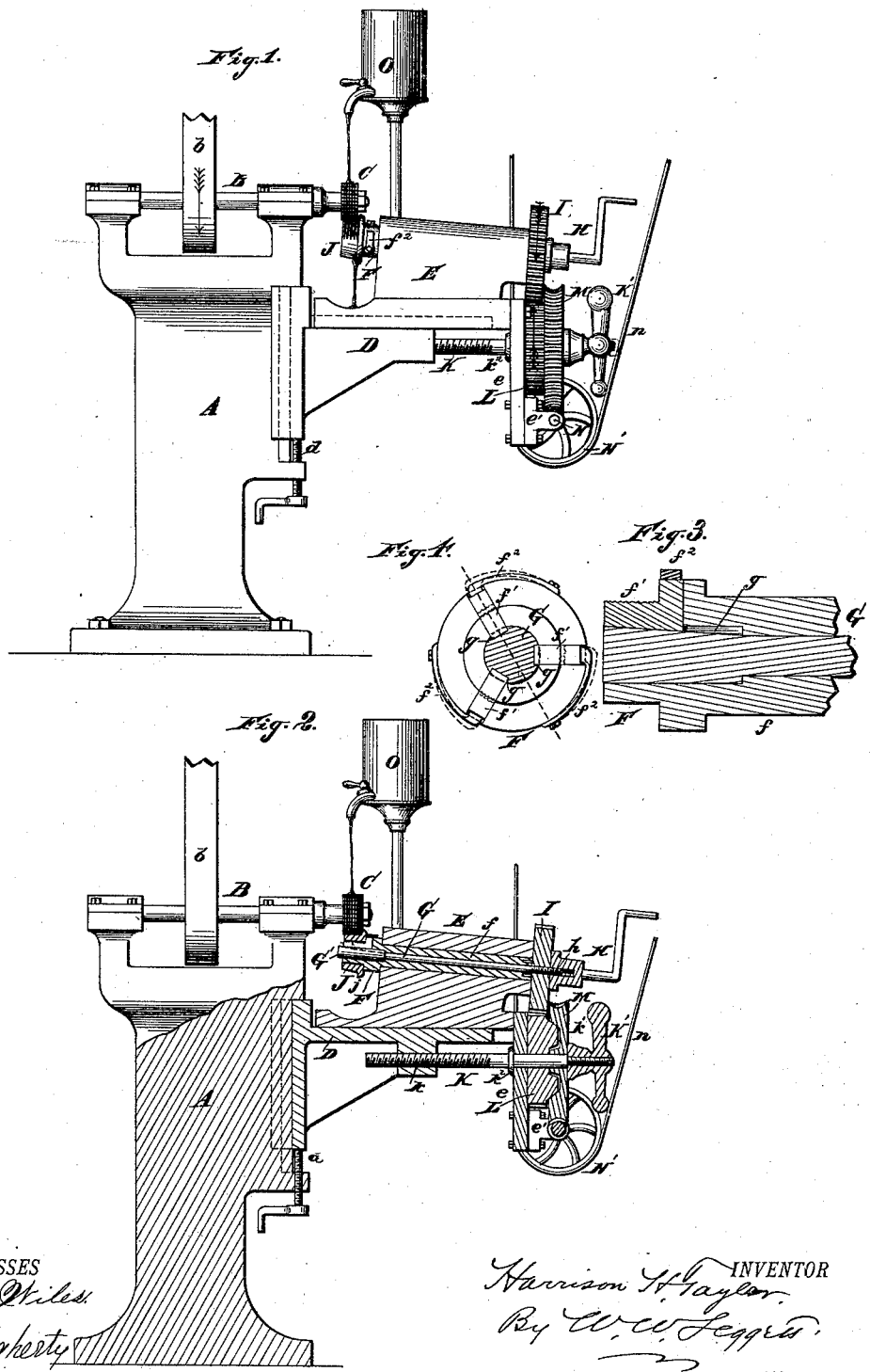

UNITED STATES PATENT OFFICE.

HARRISON H. TAYLOR, OF DETROIT, MICHIGAN, ASSIGNOR TO THE DETROIT MACHINE SCREW WORKS, OF SAME PLACE.

MACHINE FOR THREADING TAPERING BUSHINGS.

SPECIFICATION forming part of Letters Patent No. 331,167, dated November 24, 1885.

Application filed July 28, 1885. Serial No. 172,893. (No model.)

*To all whom it may concern:*

Be it known that I, HARRISON H. TAYLOR, of Detroit, county of Wayne, State of Michigan, have invented a new and useful Improvement in Machines for Screw-Threading Tapering Bushings for Gas and Water Fittings; and I declare the following to be a full, clear, and exact description of the same, such as will enable others skilled in the art to which it pertains to make and use it, reference being had to the accompanying drawings, which form a part of this specification.

My invention relates to screw-cutting machinery, and has for its object a novel machine for cutting a continuous thread upon conical tubular articles; and it consists, essentially, of suitable mechanism for cutting the threads and for feeding the work to and from the cutter, and for rotating the work in connection therewith, as more fully hereinafter described, and more fully pointed out in the claims.

In the drawings I have illustrated my invention with reference to cutting a continuous thread upon a metallic bushing, although my invention is also applicable to cutting dies and taps and analogous uses.

Figure 1 is a front elevation of such a machine embodying my invention. Fig. 2 is a vertical section with parts in elevation. Fig. 3 is a separate view in section illustrating the method of holding the bushing in place for operation thereon. Fig. 4 is an end view of the same.

I carry out my invention as follows:

A represents any suitable support.

B represents a shaft journaled thereon, upon which the cutter C is located.

$b$ represents a belt for driving said shaft and cutter.

D represents a bed engaged with the support A, and made to have a vertical movement in connection therewith by any suitable means—as, for instance, by the screw $d$, by which the bed may be raised and lowered.

E is a block engaged upon said bed and capable of a horizontal movement.

F represents a chuck for holding the work, constructed with a tubular arm, $f$, engaged in said block, as shown, and provided with movable jaws $f'$, by which the work may be held firmly thereon.

G is a spindle sleeved in said chuck, constructed with wedge-shaped grooves $g$ in its head G', the construction being such that when the spindle is moved in one direction said jaws will be forced upward into firm engagement with the bushing, and when the spindle is moved in the opposite direction the jaws may retract for the release of the bushing, the jaws being retracted in such a case by means of springs $f^2$.

H is a handle screw-tapped at one end and engaged with the screw-cut end of said spindle, as shown at $h$, for moving the spindle to and fro in the chuck.

I is a gear mounted upon said spindle.

J represents a metallic bushing held in place upon the chuck.

The movable block E is provided with a pendent apron, $e$.

K is a screw-shaft engaged in said apron, and having a screw-tapped connection with the bed D, as shown at $k$, the outer end of said shaft also having a screw-tapped connection with a handle, K', as shown at $k'$. The shaft is also provided with a collar, $k^2$, located upon the inside of the apron.

L represents a gear mounted upon said shaft, meshing with the gear I.

M also represents a worm-wheel adapted to engage the gear L by a friction or other clutch, so as to be readily engaged or disengaged therefrom.

N represents a shaft provided with a worm meshing with the wheel M, and provided with a driving-pulley, N'. $n$ represents a driving-belt. $e'$ $e'$ represent brackets forming the bearing of the worm-wheel shaft M.

O represents an oil-tank. Inasmuch as the metallic bushings are tapered, the chuck is located in the block on an angle to bring the bushing at the point of contact with the cutter level therewith, it being obvious that by placing the chuck in an inclined position, as shown, the upper surface of the tapered bushing immediately below the cutter will lie in a horizontal line.

The operation of the device is as follows: The bed D having been lowered by means of the screw d, the handle H may be turned so as to force forward the spindle G, when the jaws may be retracted, as before described, the bushing removed or another about to be cut located upon the chuck, and the reverse movement of the handle will tighten the bushing thereon. All this time the gear I L and wheel M may be in operation. Now, by turning the handle K' the worm-gear M is released from its engagement with the gear L, so that said wheel M may rotate independently of the gear L. The frictional contact of the screw-tapped end of the handle H upon the gear I when the spindle G has been tightened into the clutch will be sufficient to permit the gears I and L to be rotated by means of the handle H when the worm-wheel M is released. The independent rotation of the gears I and L, as just described, will cause the block E to be moved inward by means of the screw K, engaged with the bed D, as shown at k, thereby bringing the bushing into proper position to the cutter. The bed D is then raised to bring the bushing into contact with the cutter. The worm-wheel M is then tightened upon the gear L, and motion is communicated to the gear I and to the spindle upon which said gear is located, thereby causing the rotation of the chuck upon the inner end of the spindle, and consequently to the bushing engaged therewith and in contact with the cutter. At the same time that the cutter is doing its work upon the bushing the latter is being gradually moved longitudinally to give the threads the proper form. This longitudinal movement, as will be seen, is occasioned by the rotation of the screw-shaft K, engaged with the gear L and bed D, as described, said shaft being passed through the apron e, and provided with the collar $k^2$, whereby said apron is forced outward with the rotation of the shaft. The cutter, it will be understood, is composed of a series of cutting-tools, which commence cutting all the threads simultaneously. By the gradual retraction of the block E in the manner described the proper direction is given to the spiral thread. When the revolution has been completed the bed D is dropped, as before, and another bushing inserted upon the chuck.

What I claim is—

1. In a machine for screw-threading tapering bushings, the combination, with a rotating multiple cutter, of a rotating chuck carrying the bushing, said cutter and chuck being set at an angle to each other, so that the tapering bushing at the point of contact with the cutter will be in the same plane therewith, substantially as and for the purpose described.

2. In a machine for screw-threading tapering bushings, the combination, with a rotating multiple cutter mounted upon a horizontal shaft, of a rotating chuck for carrying the bushing, said chuck being inclined at an angle to the cutter, substantially as and for the purpose described.

3. In a machine for screw-threading tapering bushings, the combination, with a rotating multiple cutter mounted upon a horizontal shaft, of a horizontally-movable block, a tubular arm located in said block in an inclined position, and having at one end a chuck upon which the bushing is carried, and a gear by which said arm is rotated, substantially as described.

4. In a machine for screw-threading tapering bushings, the combination, with a rotating multiple cutter mounted upon a horizontal shaft, of a horizontally-movable block having a tubular arm set in an inclined position in said block and carrying a chuck at one end, a vertically-movable bed for supporting the horizontally-movable block, and a gear by which said arm is rotated, substantially as described.

5. In a machine for screw-threading tapering bushings, the combination, with a rotating multiple cutter mounted upon a rotating shaft, of a vertically-movable bed supporting a horizontally-movable block, a tubular arm carrying a chuck located in said horizontally-movable block in an inclined position, a gear mounted on said arm and meshing with a gear mounted on a screw-shaft working in the vertically-movable bed, and passing through an apron depending from the horizontally-movable bed, substantially as and for the purpose described.

6. In a screw-cutting machine, a movable bed having, in combination therewith, a movable block supporting a rotatable chuck, a screw-shaft engaging said block with said bed, said shaft and said chuck provided with gear for rotating the chuck and simultaneously moving the block horizontally, substantially as and for the purpose described.

7. In a screw-cutting machine, a chuck provided with movable jaws having a spindle sleeved therein, said spindle constructed with wedge-shaped grooves adjacent to said jaws, and having a screw-tapped engagement with an operating-handle, substantially as and for the purpose described.

8. In a screw-cutting machine, the combination, with a support, of a movable bed provided with a movable block located thereon, said block provided with a chuck for holding the work, a screw-shaft connecting said block to said bed, said shaft provided with a gear, L, meshing with a gear for rotating said chuck, and a gear, M, provided with a clutch to engage and disengage the gear L, substantially as described.

9. In a screw-cutting machine, the combination, with a movable block, of a tubular chuck provided with movable jaws for holding the work, a spindle sleeved in said chuck provided with wedge-shaped orifices and provided with an operating-handle screw-tapped thereon, and with a gear, I, and mechanism for operating said gear, substantially as described.

In testimony whereof I sign this specification in the presence of two witnesses.

HARRISON H. TAYLOR.

Witnesses:
M. B. O'DOGHERTY,
N. S. WRIGHT.